US011245659B1

(12) United States Patent
Aluya (10) Patent No.: US 11,245,659 B1
(45) Date of Patent: Feb. 8, 2022

(54) SOCIAL MEDIA SYSTEM FOR ATHLETES (71) Applicant: Ochuko Aluya, Elkhorn, NE (US)

(72) Inventor: Ochuko Aluya, Elkhorn, NE (US)

(*) Notice: Subject to any disclaimer, the term of this patent is extended or adjusted under 35 U.S.C. 154(b) by 0 days.

(21) Appl. No.: 16/541,776

(22) Filed: Aug. 15, 2019

Related U.S. Application Data (60) Provisional application No. 62/720,301, filed on Aug. 21, 2018.

(51) Int. Cl.
G06F 15/16 (2006.01)
H04L 12/58 (2006.01)
G06Q 50/00 (2012.01)

(52) U.S. Cl.
CPC ............ *H04L 51/32* (2013.01); *G06Q 50/01* (2013.01)

(58) Field of Classification Search
CPC ................................ H04L 51/32; G06Q 50/01
See application file for complete search history.

(56) References Cited

U.S. PATENT DOCUMENTS

| | | | |
|---|---|---|---|
| 2007/0233569 A1 | 10/2007 | Kelley et al. | |
| 2008/0104495 A1 | 5/2008 | Craig | |
| 2008/0108456 A1* | 5/2008 | Bonito | G06Q 30/0267 473/409 |
| 2008/0318199 A1* | 12/2008 | Crouch | G09B 5/00 434/350 |
| 2011/0289574 A1* | 11/2011 | Hull | G06Q 30/02 726/7 |
| 2012/0290977 A1* | 11/2012 | Devecka | G06Q 10/10 715/810 |
| 2013/0073389 A1 | 3/2013 | Heath | |
| 2013/0218310 A1* | 8/2013 | Johnson | G06Q 10/00 700/91 |
| 2013/0290202 A1* | 10/2013 | Nunnery | G06Q 50/01 705/319 |
| 2014/0046955 A1 | 2/2014 | Dollard | |
| 2014/0114450 A1* | 4/2014 | Martin | G06Q 10/06 700/91 |
| 2014/0297745 A1 | 10/2014 | Tarbox et al. | |
| 2015/0081713 A1 | 5/2015 | Alonso et al. | |
| 2015/0131845 A1 | 5/2015 | Forouhar et al. | |
| 2015/0220888 A1* | 8/2015 | Iyer | G06Q 10/1095 705/7.19 |
| 2018/0048656 A1* | 2/2018 | Bingham | H04L 63/102 |

* cited by examiner

Primary Examiner — Anh Nguyen
(74) Attorney, Agent, or Firm — John Rizvi; John Rizvi, P.A.—The Patent Professor®

(57) ABSTRACT

A social media system for athletes is disclosed. The system comprises a user interface accessible via an internet-enabled device and which allows a user, such as an athlete, to enter their life story, achievements, and legacy for other users to view and interact with. The system also allows users such as sports agents, coaches, and teachers to connect within the system and communicate with the athletes. The journal system permits a user to track their entire career while also seeking or providing mentorship and guidance for their career. Parents of minor athletes can also use the system to create profiles and enter records for their children, who may then assume control of the profile once they come of age. In this way, the system brings together athletes of all ages and in various stages of their careers to create a supportive networking environment.

18 Claims, 10 Drawing Sheets

SOCIAL MEDIA SYSTEM FOR ATHLETES

CROSS-REFERENCE TO RELATED APPLICATION

This application claims the benefit of U.S. Provisional Patent Application Ser. No. 62/720,301, filed Aug. 21, 2018, which is incorporated herein in its entirety.

FIELD OF THE INVENTION

The present invention relates generally to software, and more particularly, to a social media system for athletes.

BACKGROUND OF THE INVENTION

A journal is a record of entries including a person's experiences and thoughts related to such experiences. As opposed to a personal diary, which may be intended to comprise daily or frequent entries, a journal may be more appropriately used to record major or notable life events and experiences. Journals were originally made available in physical document and book form, though have modernly become available as downloadable software and online applications. For example, users may enjoy the numerous benefits of cloud storage applied to their journal.

Downloadable software journals, and physically printed journals, may comprise a variety of selectable templates in which a user may make their journal entries, and such software may permit a user to download, print, and populate the journal or create and save it online. Further, software journals may allow a user to take advantage of social media, screenshots, and photos acquired through their smart phone. But, currently there are no journal applications that are geared to professionals such as athletes.

Therefore, there is a need in the art for a social media system for athletes that allows an athlete to publish their story, achievements, and legacy, and permit other users of the system to interact with the athlete and their published journal.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments or examples of the present disclosure, a social media system for athletes is disclosed.

In another aspect, the social media system for athletes may comprise a user profile database.

In another aspect, the social media system for athletes may comprise a plurality of profile types.

In another aspect, the social media system for athletes may comprise a plurality of profile permissions.

In another aspect, the social media system for athletes may comprise a personal messaging function.

In another aspect, the social media system for athletes may comprise a public messaging function.

In another aspect, the social media system for athletes may comprise an interactive forum.

In another aspect, the social media system for athletes may comprise a calendar of events.

In another aspect, the social media system for athletes may comprise a mentor/mentee function that allows users to find mentors or mentees.

In another aspect, the social media system for athletes allows a user to share medals and achievements.

In another aspect, the social media system for athletes allows a user to search for athletic talent.

In another aspect, the social media system for athletes allows a user to share their activity.

In another aspect, the social media system for athletes allows a user to share their grades.

As another example, disclosed are one or more storage machines holding instructions executable by one or more logic machines to carry out a social media method for athletes, the method comprising, using at least one logic machine: automatically determining receipt of a user input through a graphical user interface by automatically tracking user operation of the graphical user interface; creating an athlete profile based on the user input; developing a network between a plurality of athlete profiles; and entering a journal entry in response to the user input.

In another aspect, the athlete profile is selected among a plurality of profile types including retired, active, upcoming, and amateur profile types.

In another aspect, the method further comprises creating a non-athlete profile, the non-athlete profile selected among a plurality of profile types, and the profile types including fan, agent, coach, researcher, teacher, parent, and student profile types.

In another aspect, developing the network includes creating a group of athlete profiles.

In another aspect, creating the athlete profile includes auto-populating one or more fields using a user's existing social media network profile or IP address.

In another aspect, developing the network includes connecting a more senior athlete with a more junior athlete such that the senior athlete acts as a mentor for the junior athlete.

In another aspect, the method further comprises scheduling an athletic event and inviting athletes and non-athletes to the event.

In another aspect, the method further comprises sending messages between users based on the user input.

In another aspect, entering a journal entry includes submitting information relating to a user's athletic records.

In another aspect, the method further includes uploading a photo or video in response to the user input.

In another aspect, the method further comprises uploading scholastic information about a user.

In another aspect, the method further comprises uploading achievements.

In another aspect, the method further comprises uploading a training or nutrition regimen.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
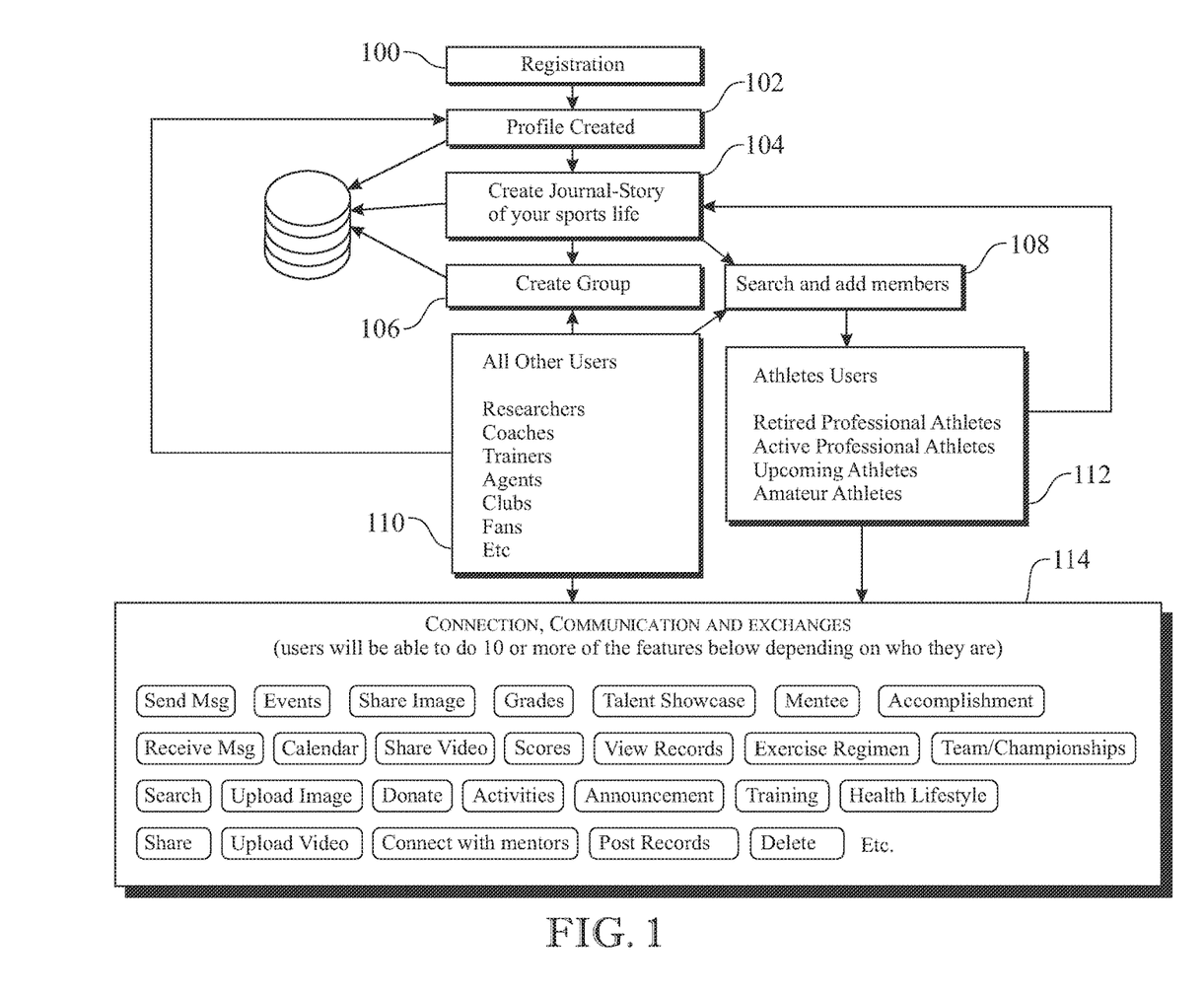
FIG. 1 schematically presents a social media system for athletes, in accordance with aspects of the present disclosure.

The illustration of FIG. 1 schematically presents a social media system for athletes. As contemplated by the present invention, the system comprises a user interface accessible via an internet-enabled device and which allows an athlete to create a profile and add details of their professional and personal lives for other persons to interact with. A user may begin by accessing the system and registering 100 a user profile. Upon registering, the user may be presented with a plurality of user profile settings that may be chosen to create their profile 102. Among the options involved in creating the profile 102 may be the selection of a profile type, and such a profile type may be associated with additional profile permissions 114 advantageous to the various profile types. Such profile types may generally comprise athlete users 112, especially retired, active, upcoming, and amateur athletes, and all other users 110, who may be a plurality of persons associated with athletes. Once the user profile has been created, the user may then create a journal entry 104, create a group 106, or search and add members 108 to their profile connections.

The illustration of FIG. 1 shows one or more features that may be provided to a user. As shown in FIG. 1, the features may be or include: sending messages, receiving messages, searching a database, sharing content, events, calendar, uploading images, uploading video, sharing images, sharing video, donating, connecting with mentors, viewing or uploading grades, viewing or uploading scores, viewing or posting activities, posting records, talent showcase, viewing records, announcements, deleting content, a mentee program, an exercise regimen, training, accomplishments, team/championships, and healthy lifestyle.

It is to be understood that the disclosed system is configured to solve technical problems in computing that prevent the features, aspects, or elements disclosed herein from being enabled and/or implemented.

As a non-limiting example, the disclosure teaches action by a processor to execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented. Therefore the disclosed technical solutions eliminate or alleviate these problems and positively contribute to the technical abilities of existing computing systems and methods.

Figure 2:
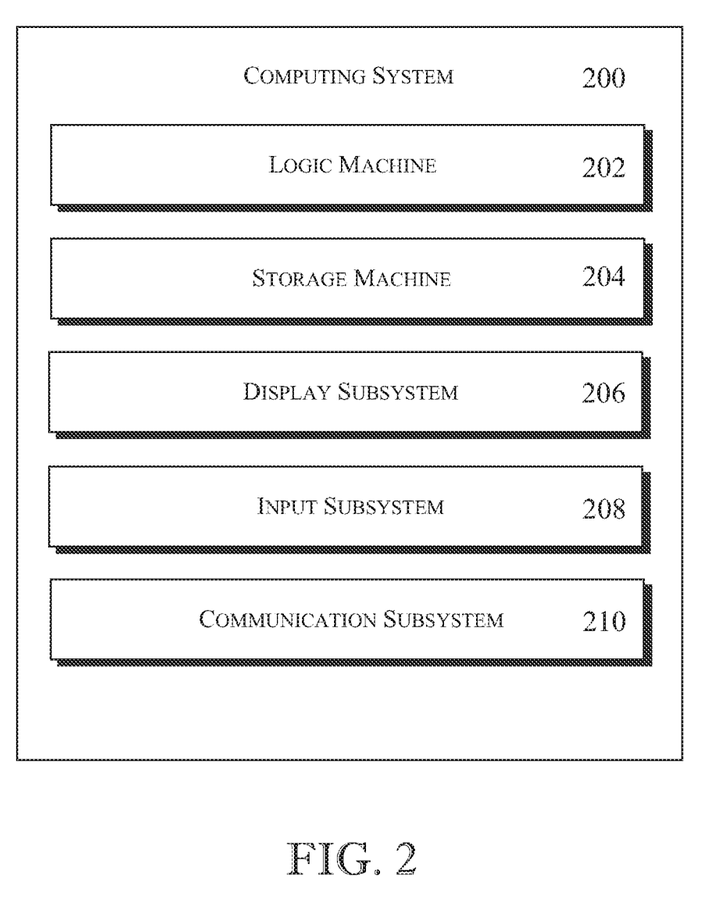
FIG. 2 schematically presents a computing system configured to carry out and actualize methods and tasks described herein, in accordance with aspects of the present disclosure.

The illustration of FIG. 2 schematically presents a computing system that may represent an embodiment of the present invention. In some embodiments the method is executed on a computing system such as computing system 200 of FIG. 2. For example, storage machine 204 may hold instructions executable by logic machine 202 to provide the method to users. Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above. The described method may be executed, provided or implemented to a user on one or more computing devices via a computer-program product such as via an application programming interface (API). FIG. 2 schematically shows a non-limiting exemplary embodiment of a computing system 200 that can enact the method described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

Figure 3:
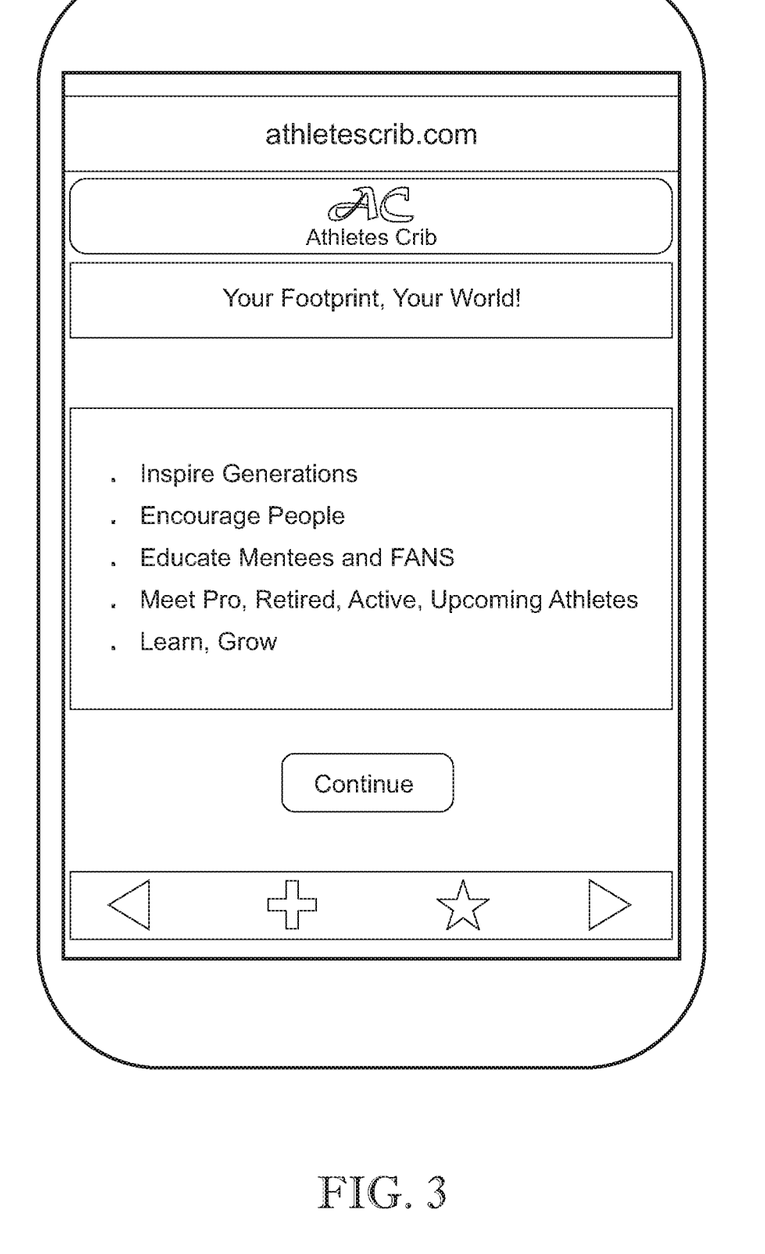
FIG. 3 illustrates a user interface of a social media system for athletes, showing a potential splash page.

The illustration of FIG. 3 illustrates a user interface of a social media system for athletes, showing a potential splash page that may be shown upon a user accessing the system. The splash page may show the title and logo of the system, and may further display a tag line and a plurality of system features and abilities.

Figure 4:
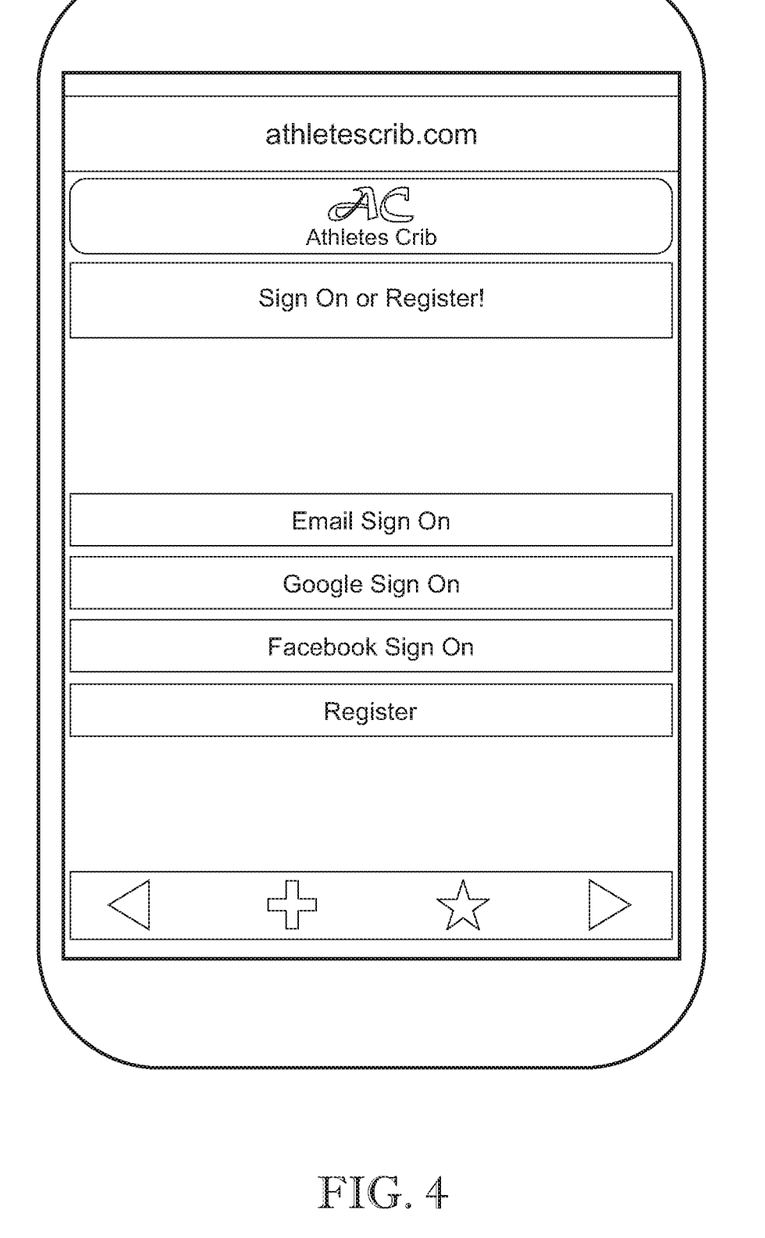
FIG. 4 illustrates a user interface of a social media system for athletes, showing a sign on page.
Figure 5:
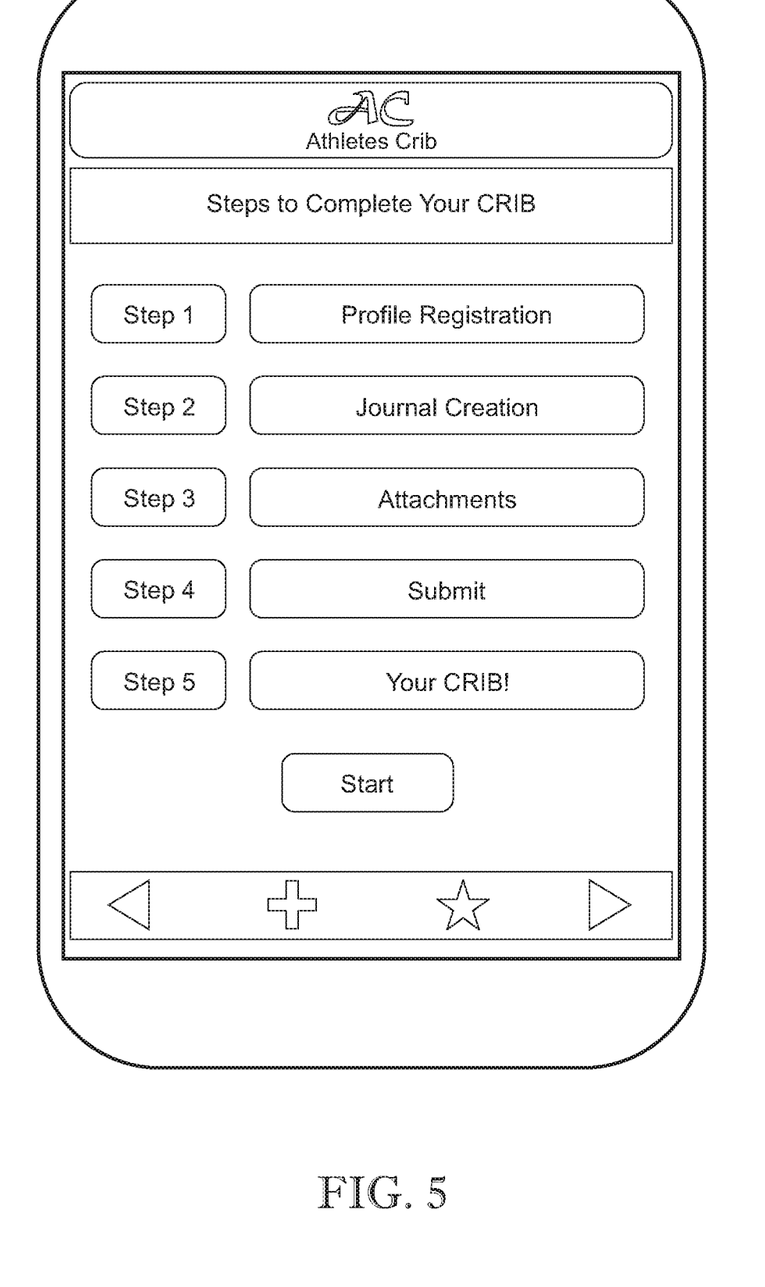
FIG. 5 illustrates a user interface of a social media system for athletes, showing a profile setup main page.
Figure 6:
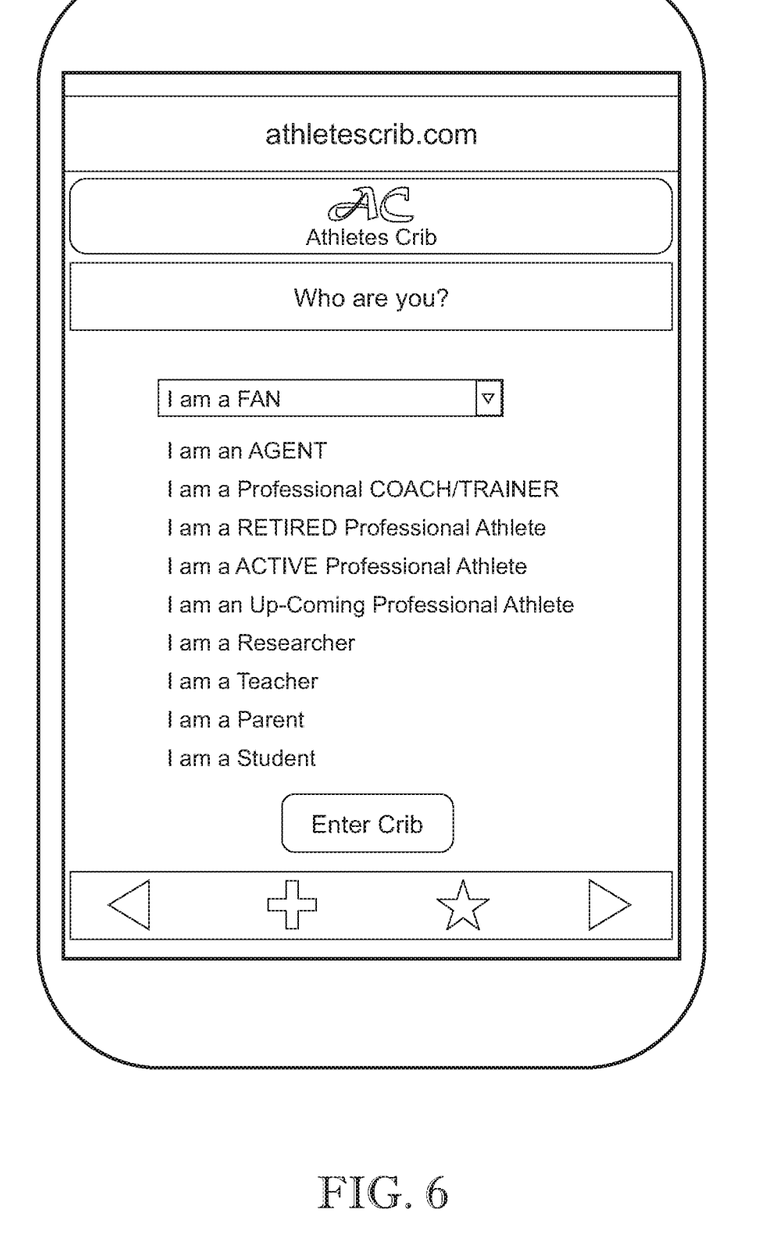
FIG. 6 illustrates a user interface of a social media system for athletes, showing a profile type selection page.

The illustrations of FIGS. 4-6 illustrate a user interface of a social media system for athletes, showing the process by which a user may register or log into the system. The system may comprise an email registration and sign on ability, which would allow a user to manually enter their user information and profile settings, or may comprise a social network registration and sign on ability that may auto-populate a number of profile settings that the user may then review.

The registration process of the system may involve the creation of a unique username, the setting of a password, the consenting to a software privacy policy, and the confirmation of the user's telephone number or email address. Profile creation for the user may involve inputting a plurality of user data such as the user's public name, birthday, gender, location, contact information, educational background, and profile picture. Such user data may be auto-populated from the user's social network profiles, or may even be assumed from the user's hardware information such as their internet protocol (IP) address.

Once the user's demographic information has been set, the user may select from a variety of profile types, which may include: active professional athlete, retired professional athlete, fan, agent, coach, researcher, teacher, parent, and student. The selection of the various profile types may be further associated with profile permissions for accessing various features in the system itself. The user may also create their journal framework and assign attachments to it before submitting their framework to the system database. Once all of the settings have been entered, the user's profile is registered and the user has access to their journal creation main page.

Figure 7:
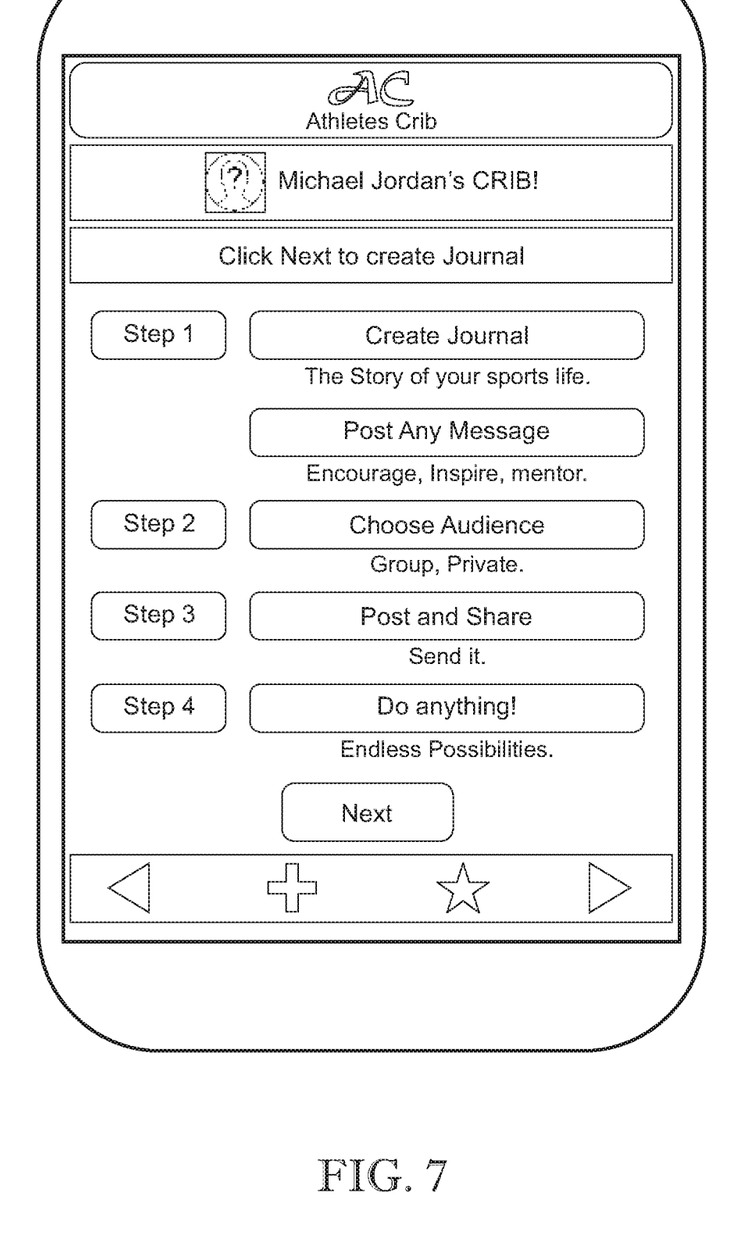
FIG. 7 illustrates a user interface of a social media system for athletes, showing a journal creation main page.
Figure 8:
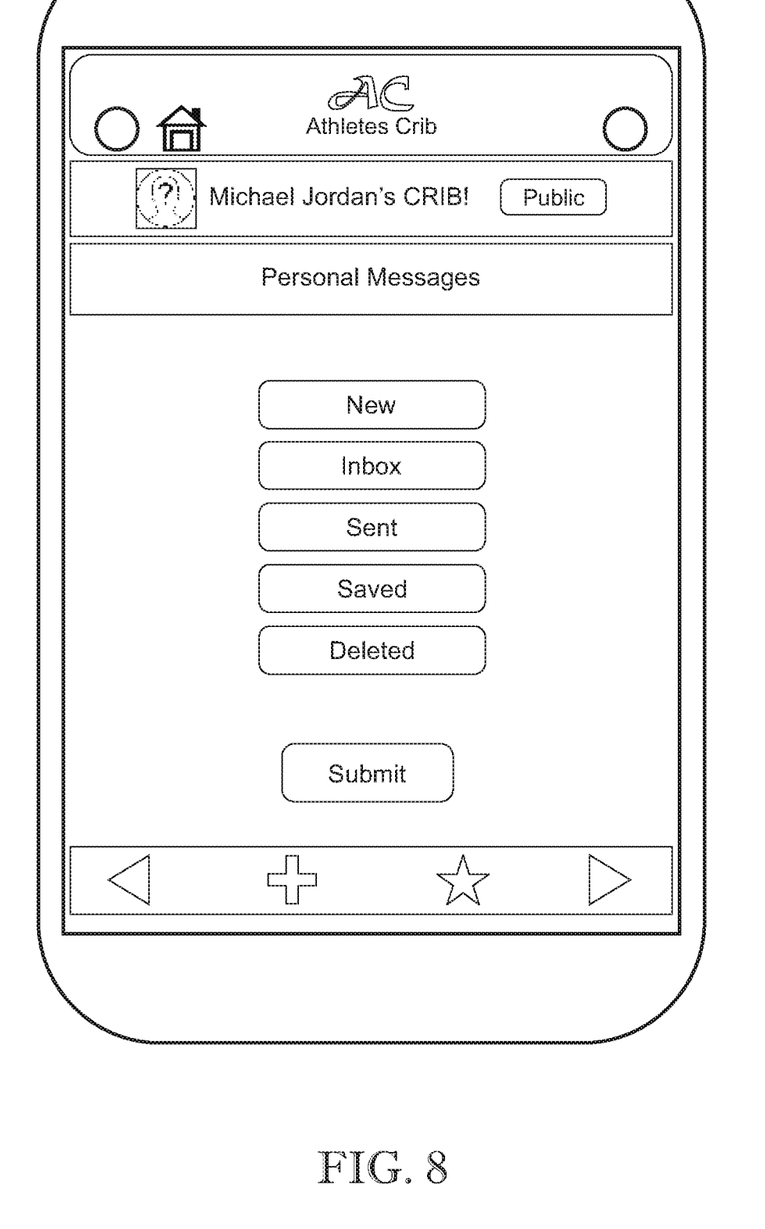
FIG. 8 illustrates a user interface of a social media system for athletes, showing a personal message main page.
Figure 9:
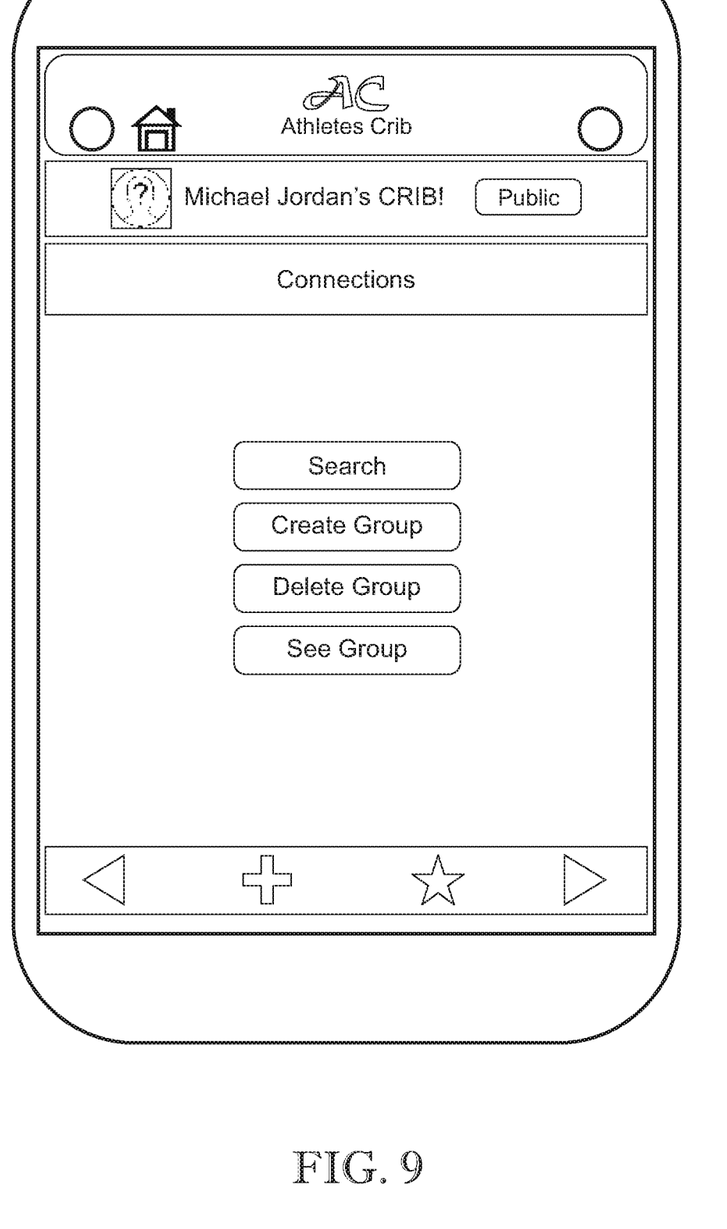
FIG. 9 illustrates a user interface of a social media system for athletes, showing a connections main page.

The illustrations of FIGS. 7-9 illustrate a user interface of a social media system for athletes, showing a journal creation main page. The user may create journal entries in the journal system to report on achievements and statistics related to their athletic records. Individual journal entries may comprise a variety of details, such as team name, dates of play, goals scored, and other relevant statistics. The user may also upload photos and videos related to the event, and may bring special attention to any awards received during the event.

Central to the system function is the concept of developing a network between players of varying ages, skills, and professional developments. To realize such a function, the system may allow users to follow or connect with each other for the purposes of social interaction and mentoring. More specifically the system may allow a more senior athlete to connect with a more junior athlete as a mentor, and such a relationship between the two users may allow for additional features of the system to become enabled. The user may also send and receive private messages between related and networked users, and may post public messages for all users to interact with. The system may further comprise a search function that allows various users to find other users of specific profile types, such as mentors, coaches, and agents.

Figure 10:
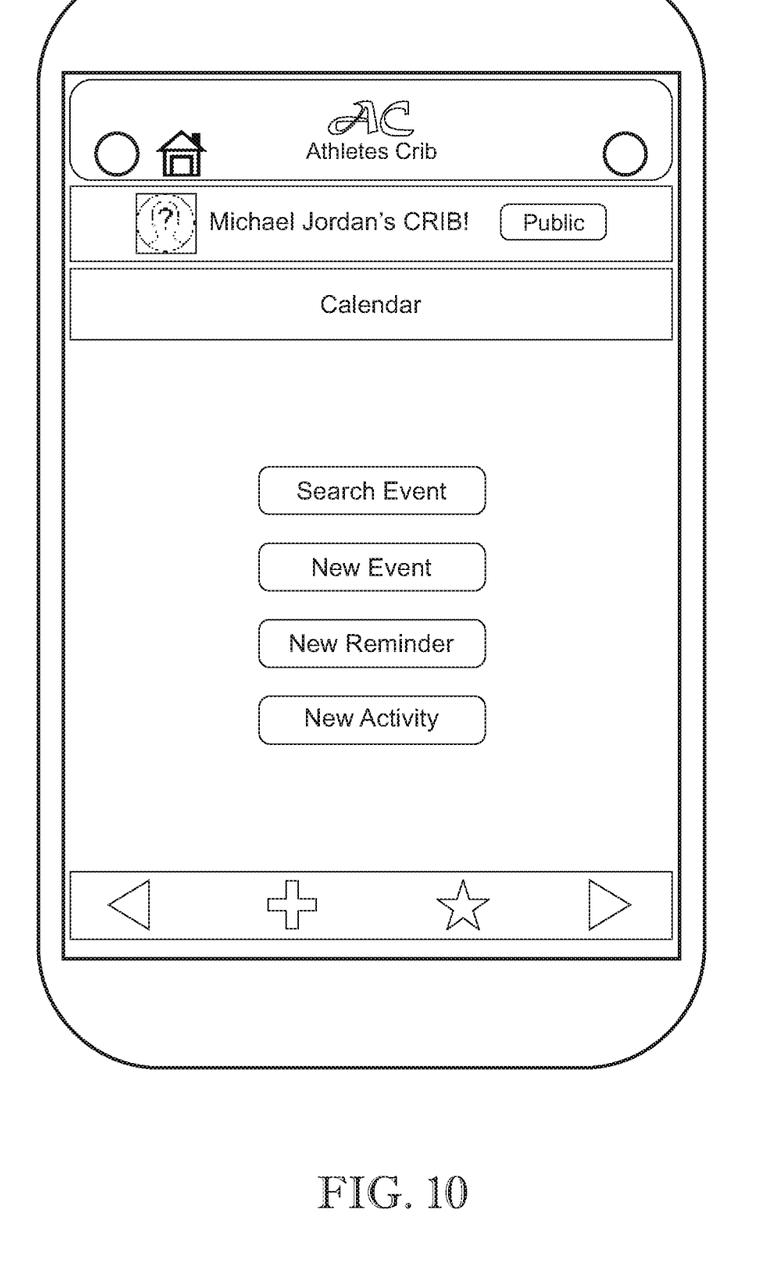
FIG. 10 illustrates a user interface of a social media system for athletes, showing a calendar main page.

The illustration of FIG. 10 illustrates a user interface of a social media system for athletes, showing a calendar main page. Users of specific profile types may be granted additional permissions in the system to create calendar events for other users to attend. For example, a senior professional athlete may schedule a basketball camp and invite junior athletes to attend, or a coach may schedule a practice event for his team to attend and may invite sports agents or professional athletes to attend as well. The calendar event setup may allow a user to select a date and time for the event, add a location for the event, set privacy settings for the event, add any appropriate notes or details, and upload pictures or attachments.

In conclusion, disclosed is a software platform for sports enthusiasts. Among other features, the platform is configured to act as a social media network, a messenger, and a journal.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. One or more storage machines holding instructions executable by one or more logic machines to carry out a social media method for athletes, the method comprising:
using at least one logic machine:
automatically determining receipt of a user input through a graphical user interface by automatically tracking user operation of the graphical user interface;

creating an athlete profile based on the user input, wherein creating the athlete profile comprises auto-populating one or more fields from an internet protocol (IP) address associated with a user;

developing a network between a plurality of athlete profiles;

entering a journal entry in response to the user input;

creating a non-athlete profile of a researcher profile type; and scheduling an athletic event and inviting athletes and non-athletes to the event, wherein scheduling the athletic event comprises granting additional permissions to a user of particular profile type to create a calendar event, wherein the user of particular profile type is a senior athlete or a coach, wherein granting the additional permissions comprises granting additional permissions to the senior athlete or the coach, wherein the additional permissions to create the calendar event comprise permissions to at least: select a date and time for the calendar event, add a location for the calendar event, set privacy settings for the calendar event, add notes to the calendar event, and upload pictures or attachments.

2. The method of claim 1, wherein the athlete profile is selected among a plurality of profile types including retired, active, upcoming, and amateur profile types.

3. The method of claim 1, wherein the method further comprises creating another non-athlete profile, the other non-athlete profile selected among a plurality of profile types, and the profile types including fan, agent, coach, teacher, parent, and student profile types.

4. The method of claim 1, wherein developing the network includes creating a group of athlete profiles.

5. The method of claim 1, wherein creating the athlete profile further includes auto-populating one or more fields using a user's existing social media network profile.

6. The method of claim 1, wherein developing the network includes connecting senior athlete with a junior athlete such that the senior athlete acts as a mentor for the junior athlete.

7. The method of claim 1, wherein the method further comprises sending messages between users based on the user input.

8. The method of claim 1, wherein entering the journal entry includes submitting information relating to a user's athletic records.

9. The method of claim 1, wherein the method further includes uploading a photo or video in response to the user input.

10. The method of claim 1, wherein the method further comprises uploading scholastic information about the user.

11. The method of claim 1, wherein the method further comprises uploading achievements.

12. The method of claim 1, wherein the method further comprises uploading a training or nutrition regimen.

13. One or more storage machines holding instructions executable by one or more logic machines to carry out a social media method for athletes, the method comprising:

using at least one logic machine:
automatically determining receipt of a user input through a graphical user interface by automatically tracking user operation of the graphical user interface;

creating an athlete profile based on the user input, wherein creating the athlete profile comprises auto-populating one or more fields from an internet protocol (IP) address associated with a user;

developing a network between a plurality of athlete profiles;

entering a journal entry in response to the user input;

creating a non-athlete profile of a researcher profile type; and scheduling an athletic event and inviting athletes and non-athletes to the event, wherein scheduling the athletic event comprises granting additional permissions to a user of particular profile type to create a calendar event, wherein the user of particular profile type is a senior athlete or a coach, wherein granting the additional permissions comprises granting additional permissions to the senior athlete or the coach, wherein the additional permissions to create the calendar event comprise permissions to at least: select a date and time for the calendar event, add a location for the calendar event, set privacy settings for the calendar event, add notes to the calendar event, and upload pictures or attachments, and wherein developing the network includes connecting the senior athlete with a junior athlete such that the senior athlete acts as a mentor for the junior athlete.

14. The method of claim 13, wherein the athlete profile is selected among a plurality of profile types including retired, active, upcoming, and amateur profile types.

15. The method of claim 13, wherein the method further comprises creating another non-athlete profile, the other non-athlete profile selected among a plurality of profile types, and the profile types including fan, agent, coach, teacher, parent, and student profile types.

16. The method of claim 13, wherein developing the network includes creating a group of athlete profiles.

17. The method of claim 13, wherein creating the athlete profile further includes auto-populating one or more fields using a user's existing social media network profile.

18. One or more storage machines holding instructions executable by one or more logic machines to carry out a social media method for athletes, the method comprising:

using at least one logic machine:
automatically determining receipt of a user input through a graphical user interface by automatically tracking user operation of the graphical user interface;

creating an athlete profile based on the user input, wherein creating the athlete profile comprises auto-populating one or more fields from an internet protocol (IP) address associated with a user;

developing a network between a plurality of athlete profiles;

entering a journal entry in response to the user input; wherein entering the journal entry includes submitting information relating to their athletic records;

creating a non-athlete profile of a researcher profile type; and scheduling an athletic event and inviting athletes and non-athletes to the event, wherein scheduling the athletic event comprises granting additional permissions to a user of particular profile type to create a calendar event, wherein the user of particular profile type is a senior athlete or a coach, wherein granting the additional permissions comprises granting additional permissions to the senior athlete or the coach, wherein the additional permissions to create the calendar event comprise permissions to at least: select a date and time for the calendar event, add a location for the calendar event, set privacy settings for the calendar event, add notes to the calendar event, and upload pictures or attachments.

* * * * *